US012434152B2

(12) United States Patent
Plummer

(10) Patent No.: US 12,434,152 B2
(45) Date of Patent: Oct. 7, 2025

(54) SYSTEMS AND METHODS FOR DYNAMICALLY ENABLING FEATURE CHANGES IN A MOBILE GAME

(71) Applicant: Activision Publishing, Inc., Santa Monica, CA (US)

(72) Inventor: Christopher Eugene Plummer, Venice, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 190 days.

(21) Appl. No.: 17/938,095

(22) Filed: Oct. 5, 2022

(65) Prior Publication Data

US 2023/0113835 A1 Apr. 13, 2023

Related U.S. Application Data

(60) Provisional application No. 63/262,479, filed on Oct. 13, 2021.

(51) Int. Cl.

| | |
|---|---|
| *A63F 13/69* | (2014.01) |
| *A63F 13/211* | (2014.01) |
| *A63F 13/428* | (2014.01) |
| *A63F 13/837* | (2014.01) |
| *A63F 13/87* | (2014.01) |

(52) U.S. Cl.

CPC ............ *A63F 13/69* (2014.09); *A63F 13/211* (2014.09); *A63F 13/428* (2014.09); *A63F 13/837* (2014.09); *A63F 13/87* (2014.09)

(58) Field of Classification Search

CPC .............................. A63F 13/69; A63F 13/211

See application file for complete search history.

(56) References Cited

U.S. PATENT DOCUMENTS

| | | | |
|---|---|---|---|
| 5,530,796 | A | 6/1996 | Wang |
| 5,561,736 | A | 10/1996 | Moore |
| 5,563,946 | A | 10/1996 | Cooper |
| 5,685,775 | A | 11/1997 | Bakoglu |
| 5,706,507 | A | 1/1998 | Schloss |
| 5,708,764 | A | 1/1998 | Borrel |
| 5,736,985 | A | 4/1998 | Lection |
| 5,737,416 | A | 4/1998 | Cooper |
| 5,745,678 | A | 4/1998 | Herzberg |
| 5,768,511 | A | 6/1998 | Galvin |
| 5,825,877 | A | 10/1998 | Dan |
| 5,835,692 | A | 11/1998 | Cragun |
| 5,878,233 | A | 3/1999 | Schloss |
| 5,883,628 | A | 3/1999 | Mullaly |
| 5,900,879 | A | 5/1999 | Berry |
| 5,903,266 | A | 5/1999 | Berstis |

(Continued)

FOREIGN PATENT DOCUMENTS

| | | |
|---|---|---|
| AU | 768367 | 3/2004 |
| AU | 2005215048 | 10/2011 |

(Continued)

*Primary Examiner* — James S. McClellan

(74) *Attorney, Agent, or Firm* — Novel IP

(57) ABSTRACT

A method for selecting a mode for interacting with a video game is provided. The method includes identifying an input to the video game and providing the game in a first mode based on the identified input. The method further includes providing the game in a second mode based on identifying a change to the input.

18 Claims, 7 Drawing Sheets

(56) References Cited

U.S. PATENT DOCUMENTS

| | | | |
|---|---|---|---|
| 5,903,271 | A | 5/1999 | Bardon |
| 5,911,045 | A | 6/1999 | Leyba |
| 5,920,325 | A | 7/1999 | Morgan |
| 5,923,324 | A | 7/1999 | Berry |
| 5,969,724 | A | 10/1999 | Berry |
| 5,977,979 | A | 11/1999 | Clough |
| 5,990,888 | A | 11/1999 | Blades |
| 6,014,145 | A | 1/2000 | Bardon |
| 6,025,839 | A | 2/2000 | Schell |
| 6,059,842 | A | 5/2000 | Dumarot |
| 6,069,632 | A | 5/2000 | Mullaly |
| 6,081,270 | A | 6/2000 | Berry |
| 6,081,271 | A | 6/2000 | Bardon |
| 6,091,410 | A | 7/2000 | Lection |
| 6,094,196 | A | 7/2000 | Berry |
| 6,098,056 | A | 8/2000 | Rusnak |
| 6,104,406 | A | 8/2000 | Berry |
| 6,111,581 | A | 8/2000 | Berry |
| 6,134,588 | A | 10/2000 | Guenthner |
| 6,144,381 | A | 11/2000 | Lection |
| 6,148,328 | A | 11/2000 | Cuomo |
| 6,185,614 | B1 | 2/2001 | Cuomo |
| 6,201,881 | B1 | 3/2001 | Masuda |
| 6,222,551 | B1 | 4/2001 | Schneider |
| 6,271,842 | B1 | 8/2001 | Bardon |
| 6,271,843 | B1 | 8/2001 | Lection |
| 6,282,547 | B1 | 8/2001 | Hirsch |
| 6,311,206 | B1 | 10/2001 | Malkin |
| 6,334,141 | B1 | 12/2001 | Varma |
| 6,336,134 | B1 | 1/2002 | Varma |
| 6,337,700 | B1 | 1/2002 | Kinoe |
| 6,353,449 | B1 | 3/2002 | Gregg |
| 6,356,297 | B1 | 3/2002 | Cheng |
| 6,411,312 | B1 | 6/2002 | Sheppard |
| 6,426,757 | B1 | 7/2002 | Smith |
| 6,445,389 | B1 | 9/2002 | Bossen |
| 6,452,593 | B1 | 9/2002 | Challener |
| 6,462,760 | B1 | 10/2002 | Cox, Jr. |
| 6,469,712 | B1 | 10/2002 | Hilpert, Jr. |
| 6,473,085 | B1 | 10/2002 | Brock |
| 6,499,053 | B1 | 12/2002 | Marquette |
| 6,505,208 | B1 | 1/2003 | Kanevsky |
| 6,525,731 | B1 | 2/2003 | Suits |
| 6,549,933 | B1 | 4/2003 | Barrett |
| 6,567,109 | B1 | 5/2003 | Todd |
| 6,618,751 | B1 | 9/2003 | Challenger |
| RE38,375 | E | 12/2003 | Herzberg |
| 6,657,617 | B2 | 12/2003 | Paolini |
| 6,657,642 | B1 | 12/2003 | Bardon |
| 6,684,255 | B1 | 1/2004 | Martin |
| 6,717,600 | B2 | 4/2004 | Dutta |
| 6,734,884 | B1 | 5/2004 | Berry |
| 6,765,596 | B2 | 7/2004 | Lection |
| 6,781,607 | B1 | 8/2004 | Benham |
| 6,819,669 | B2 | 11/2004 | Rooney |
| 6,832,239 | B1 | 12/2004 | Kraft |
| 6,836,480 | B2 | 12/2004 | Basso |
| 6,886,026 | B1 | 4/2005 | Hanson |
| 6,948,168 | B1 | 9/2005 | Kuprionas |
| RE38,865 | E | 11/2005 | Dumarot |
| 6,993,596 | B2 | 1/2006 | Hinton |
| 7,028,296 | B2 | 4/2006 | Irfan |
| 7,062,533 | B2 | 6/2006 | Brown |
| 7,143,409 | B2 | 11/2006 | Herrero |
| 7,209,137 | B2 | 4/2007 | Brokenshire |
| 7,230,616 | B2 | 6/2007 | Taubin |
| 7,249,123 | B2 | 7/2007 | Elder |
| 7,263,511 | B2 | 8/2007 | Bodin |
| 7,287,053 | B2 | 10/2007 | Bodin |
| 7,305,438 | B2 | 12/2007 | Christensen |
| 7,308,476 | B2 | 12/2007 | Mannaru |
| 7,404,149 | B2 | 7/2008 | Fox |
| 7,426,538 | B2 | 9/2008 | Bodin |
| 7,427,980 | B1 | 9/2008 | Partridge |
| 7,428,588 | B2 | 9/2008 | Berstis |
| 7,429,987 | B2 | 9/2008 | Leah |
| 7,436,407 | B2 | 10/2008 | Doi |
| 7,439,975 | B2 | 10/2008 | Hsu |
| 7,443,393 | B2 | 10/2008 | Shen |
| 7,447,996 | B1 | 11/2008 | Cox |
| 7,467,181 | B2 | 12/2008 | McGowan |
| 7,475,354 | B2 | 1/2009 | Guido |
| 7,478,127 | B2 | 1/2009 | Creamer |
| 7,484,012 | B2 | 1/2009 | Hinton |
| 7,503,007 | B2 | 3/2009 | Goodman |
| 7,506,264 | B2 | 3/2009 | Polan |
| 7,515,136 | B1 | 4/2009 | Kanevsky |
| 7,525,964 | B2 | 4/2009 | Astley |
| 7,552,177 | B2 | 6/2009 | Kessen |
| 7,565,650 | B2 | 7/2009 | Bhogal |
| 7,571,224 | B2 | 8/2009 | Childress |
| 7,571,389 | B2 | 8/2009 | Broussard |
| 7,580,888 | B2 | 8/2009 | Ur |
| 7,596,596 | B2 | 9/2009 | Chen |
| 7,640,587 | B2 | 12/2009 | Fox |
| 7,667,701 | B2 | 2/2010 | Leah |
| 7,698,656 | B2 | 4/2010 | Srivastava |
| 7,702,784 | B2 | 4/2010 | Berstis |
| 7,714,867 | B2 | 5/2010 | Doi |
| 7,719,532 | B2 | 5/2010 | Schardt |
| 7,719,535 | B2 | 5/2010 | Tadokoro |
| 7,734,691 | B2 | 6/2010 | Creamer |
| 7,737,969 | B2 | 6/2010 | Shen |
| 7,743,095 | B2 | 6/2010 | Goldberg |
| 7,747,679 | B2 | 6/2010 | Galvin |
| 7,765,478 | B2 | 7/2010 | Reed |
| 7,768,514 | B2 | 8/2010 | Pagan |
| 7,773,087 | B2 | 8/2010 | Fowler |
| 7,774,407 | B2 | 8/2010 | Daly |
| 7,782,318 | B2 | 8/2010 | Shearer |
| 7,792,263 | B2 | 9/2010 | D Amora |
| 7,792,801 | B2 | 9/2010 | Hamilton, II |
| 7,796,128 | B2 | 9/2010 | Radzikowski |
| 7,808,500 | B2 | 10/2010 | Shearer |
| 7,814,152 | B2 | 10/2010 | McGowan |
| 7,827,318 | B2 | 11/2010 | Hinton |
| 7,843,471 | B2 | 11/2010 | Doan |
| 7,844,663 | B2 | 11/2010 | Boutboul |
| 7,847,799 | B2 | 12/2010 | Taubin |
| 7,856,469 | B2 | 12/2010 | Chen |
| 7,873,485 | B2 | 1/2011 | Castelli |
| 7,882,222 | B2 | 2/2011 | Dolbier |
| 7,882,243 | B2 | 2/2011 | Ivory |
| 7,884,819 | B2 | 2/2011 | Kuesel |
| 7,886,045 | B2 | 2/2011 | Bates |
| 7,890,623 | B2 | 2/2011 | Bates |
| 7,893,936 | B2 | 2/2011 | Shearer |
| 7,904,829 | B2 | 3/2011 | Fox |
| 7,921,128 | B2 | 4/2011 | Hamilton, II |
| 7,940,265 | B2 | 5/2011 | Brown |
| 7,945,620 | B2 | 5/2011 | Bou-Ghannam |
| 7,945,802 | B2 | 5/2011 | Hamilton, II |
| 7,970,837 | B2 | 6/2011 | Lyle |
| 7,970,840 | B2 | 6/2011 | Cannon |
| 7,985,138 | B2 | 7/2011 | Acharya |
| 7,990,387 | B2 | 8/2011 | Hamilton, II |
| 7,996,164 | B2 | 8/2011 | Hamilton, II |
| 8,001,161 | B2 | 8/2011 | Finn |
| 8,004,518 | B2 | 8/2011 | Fowler |
| 8,005,025 | B2 | 8/2011 | Bodin |
| 8,006,182 | B2 | 8/2011 | Bates |
| 8,013,861 | B2 | 9/2011 | Hamilton, II |
| 8,018,453 | B2 | 9/2011 | Fowler |
| 8,018,462 | B2 | 9/2011 | Bhogal |
| 8,019,797 | B2 | 9/2011 | Hamilton, II |
| 8,019,858 | B2 | 9/2011 | Bauchot |
| 8,022,948 | B2 | 9/2011 | Garbow |
| 8,022,950 | B2 | 9/2011 | Brown |
| 8,026,913 | B2 | 9/2011 | Garbow |
| 8,028,021 | B2 | 9/2011 | Reisinger |
| 8,028,022 | B2 | 9/2011 | Brownholtz |
| 8,037,416 | B2 | 10/2011 | Bates |
| 8,041,614 | B2 | 10/2011 | Bhogal |
| 8,046,700 | B2 | 10/2011 | Bates |

(56) References Cited

U.S. PATENT DOCUMENTS

| | | | | |
|---|---|---|---|---|
| 8,051,462 | B2 | 11/2011 | Hamilton, II | |
| 8,055,656 | B2 | 11/2011 | Cradick | |
| 8,056,121 | B2 | 11/2011 | Hamilton, II | |
| 8,057,307 | B2 | 11/2011 | Berstis | |
| 8,062,130 | B2 | 11/2011 | Smith | |
| 8,063,905 | B2 | 11/2011 | Brown | |
| 8,070,601 | B2 | 12/2011 | Acharya | |
| 8,082,245 | B2 | 12/2011 | Bates | |
| 8,085,267 | B2 | 12/2011 | Brown | |
| 8,089,481 | B2 | 1/2012 | Shearer | |
| 8,092,288 | B2 | 1/2012 | Theis | |
| 8,095,881 | B2 | 1/2012 | Reisinger | |
| 8,099,338 | B2 | 1/2012 | Betzler | |
| 8,099,668 | B2 | 1/2012 | Garbow | |
| 8,102,334 | B2 | 1/2012 | Brown | |
| 8,103,640 | B2 | 1/2012 | Lo | |
| 8,103,959 | B2 | 1/2012 | Cannon | |
| 8,105,165 | B2 | 1/2012 | Karstens | |
| 8,108,774 | B2 | 1/2012 | Finn | |
| 8,113,959 | B2 | 2/2012 | De Judicibus | |
| 8,117,551 | B2 | 2/2012 | Cheng | |
| 8,125,485 | B2 | 2/2012 | Brown | |
| 8,127,235 | B2 | 2/2012 | Haggar | |
| 8,127,236 | B2 | 2/2012 | Hamilton, II | |
| 8,128,487 | B2 | 3/2012 | Hamilton, II | |
| 8,131,740 | B2 | 3/2012 | Cradick | |
| 8,132,235 | B2 | 3/2012 | Bussani | |
| 8,134,560 | B2 | 3/2012 | Bates | |
| 8,139,060 | B2 | 3/2012 | Brown | |
| 8,139,780 | B2 | 3/2012 | Shearer | |
| 8,140,340 | B2 | 3/2012 | Bhogal | |
| 8,140,620 | B2 | 3/2012 | Creamer | |
| 8,140,978 | B2 | 3/2012 | Betzler | |
| 8,140,982 | B2 | 3/2012 | Hamilton, II | |
| 8,145,676 | B2 | 3/2012 | Bhogal | |
| 8,145,725 | B2 | 3/2012 | Dawson | |
| 8,149,241 | B2 | 4/2012 | Do | |
| 8,151,191 | B2 | 4/2012 | Nicol, II | |
| 8,156,184 | B2 | 4/2012 | Kurata | |
| 8,165,350 | B2 | 4/2012 | Fuhrmann | |
| 8,171,407 | B2 | 5/2012 | Huang | |
| 8,171,408 | B2 | 5/2012 | Dawson | |
| 8,171,559 | B2 | 5/2012 | Hamilton, II | |
| 8,174,541 | B2 | 5/2012 | Greene | |
| 8,176,421 | B2 | 5/2012 | Dawson | |
| 8,176,422 | B2 | 5/2012 | Bergman | |
| 8,184,092 | B2 | 5/2012 | Cox | |
| 8,184,116 | B2 | 5/2012 | Finn | |
| 8,185,450 | B2 | 5/2012 | Mcvey | |
| 8,185,829 | B2 | 5/2012 | Cannon | |
| 8,187,067 | B2 | 5/2012 | Hamilton, II | |
| 8,199,145 | B2 | 6/2012 | Hamilton, II | |
| 8,203,561 | B2 | 6/2012 | Carter | |
| 8,214,335 | B2 | 7/2012 | Hamilton, II | |
| 8,214,433 | B2 | 7/2012 | Dawson | |
| 8,214,750 | B2 | 7/2012 | Hamilton, II | |
| 8,214,751 | B2 | 7/2012 | Dawson | |
| 8,217,953 | B2 | 7/2012 | Comparan | |
| 8,219,616 | B2 | 7/2012 | Dawson | |
| 8,230,045 | B2 | 7/2012 | Kawachiya | |
| 8,230,338 | B2 | 7/2012 | Dugan | |
| 8,233,005 | B2 | 7/2012 | Finn | |
| 8,234,234 | B2 | 7/2012 | Shearer | |
| 8,234,579 | B2 | 7/2012 | Do | |
| 8,239,775 | B2 | 8/2012 | Beverland | |
| 8,241,131 | B2 | 8/2012 | Bhogal | |
| 8,245,241 | B2 | 8/2012 | Hamilton, II | |
| 8,245,283 | B2 | 8/2012 | Dawson | |
| 8,265,253 | B2 | 9/2012 | D Amora | |
| 8,310,497 | B2 | 11/2012 | Comparan | |
| 8,334,871 | B2 | 12/2012 | Hamilton, II | |
| 8,360,886 | B2 | 1/2013 | Karstens | |
| 8,364,804 | B2 | 1/2013 | Childress | |
| 8,425,326 | B2 | 4/2013 | Chudley | |
| 8,442,946 | B2 | 5/2013 | Hamilton, II | |
| 8,506,372 | B2 | 8/2013 | Chudley | |
| 8,514,249 | B2 | 8/2013 | Hamilton, II | |
| 8,554,841 | B2 | 10/2013 | Kurata | |
| 8,607,142 | B2 | 12/2013 | Bergman | |
| 8,607,356 | B2 | 12/2013 | Hamilton, II | |
| 8,624,903 | B2 | 1/2014 | Hamilton, II | |
| 8,626,836 | B2 | 1/2014 | Dawson | |
| 8,692,835 | B2 | 4/2014 | Hamilton, II | |
| 8,721,412 | B2 | 5/2014 | Chudley | |
| 8,827,816 | B2 | 9/2014 | Bhogal | |
| 8,838,640 | B2 | 9/2014 | Bates | |
| 8,849,917 | B2 | 9/2014 | Dawson | |
| 8,911,296 | B2 | 12/2014 | Chudley | |
| 8,992,316 | B2 | 3/2015 | Smith | |
| 9,083,654 | B2 | 7/2015 | Dawson | |
| 9,152,914 | B2 | 10/2015 | Haggar | |
| 9,205,328 | B2 | 12/2015 | Bansi | |
| 9,286,731 | B2 | 3/2016 | Hamilton, II | |
| 9,299,080 | B2 | 3/2016 | Dawson | |
| 9,364,746 | B2 | 6/2016 | Chudley | |
| 9,525,746 | B2 | 12/2016 | Bates | |
| 9,583,109 | B2 | 2/2017 | Kurata | |
| 9,682,324 | B2 | 6/2017 | Bansi | |
| 9,764,244 | B2 | 9/2017 | Bansi | |
| 9,789,406 | B2 | 10/2017 | Marr | |
| 9,808,722 | B2 | 11/2017 | Kawachiya | |
| 2009/0113448 | A1 | 4/2009 | Smith | |
| 2011/0300946 | A1* | 12/2011 | Stafford ................ | A63F 13/332<br>463/42 |
| 2014/0243068 | A1* | 8/2014 | Cibulski ............. | G07F 17/3276<br>463/20 |
| 2014/0344725 | A1 | 11/2014 | Bates | |
| 2016/0191671 | A1 | 6/2016 | Dawson | |
| 2019/0310837 | A1* | 10/2019 | Zmijewski ............ | G06F 16/986 |
| 2020/0388106 | A1* | 12/2020 | Urban ................. | G07F 17/3216 |

FOREIGN PATENT DOCUMENTS

| | | | |
|---|---|---|---|
| CA | 2143874 | | 6/2000 |
| CA | 2292678 | | 7/2005 |
| CA | 2552135 | | 7/2013 |
| CN | 1334650 | A | 2/2002 |
| CN | 1202652 | C | 10/2002 |
| CN | 1141641 | C | 3/2004 |
| CN | 1494679 | A | 5/2004 |
| CN | 1219384 | | 9/2005 |
| CN | 1307544 | | 3/2007 |
| CN | 100407675 | | 7/2008 |
| CN | 100423016 | C | 10/2008 |
| CN | 100557637 | | 11/2009 |
| CN | 101001678 | B | 5/2010 |
| CN | 101436242 | | 12/2010 |
| CN | 101801482 | B | 12/2014 |
| EP | 668583 | | 8/1995 |
| EP | 0627728 | B1 | 9/2000 |
| EP | 0717337 | B1 | 8/2001 |
| EP | 0679977 | B1 | 10/2002 |
| EP | 0679978 | B1 | 3/2003 |
| EP | 0890924 | B1 | 9/2003 |
| EP | 1377902 | B1 | 8/2004 |
| EP | 0813132 | B1 | 1/2005 |
| EP | 1380133 | B1 | 3/2005 |
| EP | 1021021 | B1 | 9/2005 |
| EP | 0930584 | B1 | 10/2005 |
| EP | 0883087 | B1 | 8/2007 |
| EP | 1176828 | B1 | 10/2007 |
| EP | 2076888 | B1 | 7/2015 |
| GB | 2339938 | | 10/2002 |
| GB | 2352154 | | 7/2003 |
| JP | 3033956 | B2 | 4/2000 |
| JP | 3124916 | B2 | 1/2001 |
| JP | 3177221 | B2 | 6/2001 |
| JP | 3199231 | B2 | 8/2001 |
| JP | 3210558 | B2 | 9/2001 |
| JP | 3275935 | | 2/2002 |
| JP | 3361745 | | 1/2003 |
| JP | 3368188 | B2 | 1/2003 |
| JP | 3470955 | B | 9/2003 |
| JP | 3503774 | | 12/2003 |

(56) References Cited

FOREIGN PATENT DOCUMENTS

| | | | |
|---|---|---|---|
| JP | 3575598 | | 7/2004 |
| JP | 3579823 | B | 7/2004 |
| JP | 3579154 | B2 | 10/2004 |
| JP | 3701773 | B2 | 10/2005 |
| JP | 3777161 | | 3/2006 |
| JP | 3914430 | B | 2/2007 |
| JP | 3942090 | B | 4/2007 |
| JP | 3962361 | | 5/2007 |
| JP | 4009235 | B | 9/2007 |
| JP | 4225376 | | 12/2008 |
| JP | 4653075 | | 12/2010 |
| JP | 5063698 | B | 8/2012 |
| JP | 5159375 | B2 | 3/2013 |
| JP | 5352200 | B2 | 11/2013 |
| JP | 5734566 | B2 | 6/2015 |
| MY | 117864 | A | 8/2004 |
| SG | 55396 | | 12/1998 |
| WO | 2002073457 | | 9/2002 |
| WO | 20020087156 | | 10/2002 |
| WO | 2004086212 | | 10/2004 |
| WO | 2005079538 | | 9/2005 |
| WO | 2007101785 | | 9/2007 |
| WO | 2008037599 | | 4/2008 |
| WO | 2008074627 | | 6/2008 |
| WO | 2008095767 | | 8/2008 |
| WO | 2009037257 | | 3/2009 |
| WO | 2009104564 | | 8/2009 |
| WO | 2010096738 | A1 | 8/2010 |

* cited by examiner

SYSTEMS AND METHODS FOR DYNAMICALLY ENABLING FEATURE CHANGES IN A MOBILE GAME

CROSS-REFERENCE

The present specification relies on U.S. Patent Provisional Application No. 63/262,479, titled "Systems and Method for Dynamically Enabling Feature Changes in a Mobile Game" and filed on Oct. 13, 2021, for priority, which is herein incorporated by reference in its entirety.

FIELD

The present specification relates to systems and methods for operating a mobile game. More particularly, embodiments of the present specification relate to providing feature changes in the video game based on one or more physical manipulations of the mobile computing device executing the mobile game.

BACKGROUND

Mobile games offer a wide set of engagement features to players. One available feature is enabling a player to communicate with other players of a mobile game during gameplay. The communication encourages the players to coordinate amongst themselves and engage further with the game. Often, the players communicate and coordinate with their friends, clan, and other players, using an in-game platform, provided within the game interface only. In-game communication functionality provided by many games enable players to use features such as in-game text, voice and/or video chat where players can communicate with other players of the game.

These in-game communication features can be cumbersome and potentially disruptive to access. For example, if a player wishes to communicate with their friends, they may be forced to launch the game to access the in-game communication features. Launching the game often involves a lengthy loading time and/or audiovisual portions that may be distracting in a school, work, or public environment. Instead, players may resort to communicating with friends using external third-party communication clients. However, third-party communication clients are disadvantageous as they do not encourage the players to engage with the game.

Therefore, there is a need to enable a user to easily switch or choose between different modes within the gaming environment so that the user may access features related to the game in a mode that reduces distractions and are more practicable when the user is not playing the game. Furthermore, there is a need for the switch or user selection to be easily performed by a user who may be engaged in game.

SUMMARY

The following embodiments and aspects thereof are described and illustrated in conjunction with systems, tools and methods, which are meant to be exemplary and illustrative, and not limiting in scope. The present application discloses numerous embodiments.

In some embodiments, the present specification discloses a computer-implemented method for selecting a mode of a video game, the method being implemented in a mobile computing device having a processor and a random access memory, wherein the processor is in data communication with a display and with a storage unit, the method comprising: identifying a first orientation of the mobile computing device; executing the video game in a first mode based on the identified first orientation, wherein the first mode is defined by the video game executing with a first plurality of features; identifying a change to the first orientation of the mobile computing device, wherein said change indicates the mobile computing device has adopted a second orientation and wherein the second orientation is different from the first orientation; and based on the identified second orientation, stopping the execution of the video game in the first mode and initiating an execution of the video game in a second mode, wherein the second mode is defined by the video game executing with a second plurality of features and wherein at least a portion of the first plurality of features is different from at least a portion of the second plurality of features.

Optionally, the first plurality of features do not include a function enabling communication between players of the video game.

Optionally, the second plurality of features include a function enabling communication between players of the video game.

Optionally, the first orientation is one of a landscape orientation or a portrait orientation and wherein the second orientation is one of a portrait orientation or a landscape orientation Optionally, when in the landscape orientation, the video game is in the first mode and the first plurality of features comprise features enabling a player of the video game to play the video game with other individuals.

Optionally, when in the portrait orientation, the video game is in the second mode and the second plurality of features comprise features that enable a user to communicate with other individuals and do not enable the user of the video game to play the video game with other individuals.

Optionally, the first mode is a default mode and the second mode is an alternative mode and wherein the execution of the video game is shorter in the alternative mode than in the default mode.

Optionally, the first mode is a default mode and the second mode is an alternative mode and wherein the alternative mode comprises one or more communication features that are not available in the default mode.

Optionally, the first mode is a default mode and the second mode is an alternative mode, wherein, in the default mode, the execution of the video game enables a multiplayer version of the video game, and wherein, in the alternative mode, the execution of the video game enables only a single player version of the video game.

Optionally, stopping the execution of the video game in the first mode and initiating the execution of the video game in the second mode is further based on at least one of time, a location of a display, a button on the display, or a button on the mobile computing device.

In some embodiments, the present specification discloses a computer program product configured to be executed in a mobile computing device having a processor and a memory and configured to be stored in the memory, wherein, when executed by the mobile computing device, the computer program product selects a mode of a video game being executed in the mobile computing device by: identifying a first orientation of the mobile computing device; executing the video game in a first mode, based on the identified first orientation, wherein the first mode is defined by the video game executing with a first plurality of features; identifying a change to the first orientation of the mobile computing device, wherein said change indicates the mobile computing device has adopted a second orientation and wherein the second orientation is different from the first orientation; and based on the identified second orientation, stopping the execution of the video game in the first mode and initiating an execution of the video game in a second mode, wherein the second mode is defined by the video game executing with a second plurality of features and wherein at least a portion of the first plurality of features is different from at least a portion of the second plurality of features.

Optionally, the first plurality of features do not include a function enabling communication between players of the video game.

Optionally, the second plurality of features includes a function enabling communication between players of the video game.

Optionally, the first orientation is one of a landscape orientation or a portrait orientation and wherein the second orientation is one of a portrait orientation or a landscape orientation.

Optionally, when in the landscape orientation, the video game is in the first mode and the first plurality of features comprise features enabling a player of the video game to play the video game with other individuals.

Optionally, when in the portrait orientation, the video game is in the second mode and the second plurality of features comprise features that enable a user to communicate with other individuals and do not enable the user of the video game to play the video game with other individuals.

Optionally, the first mode is a default mode and the second mode is an alternative mode and wherein the execution of the video game is shorter in the alternative mode than in the default mode.

Optionally, the first mode is a default mode and the second mode is an alternative mode and wherein the alternative mode comprises one or more communication features that are not available in the default mode.

Optionally, the first mode is a default mode and the second mode is an alternative mode, wherein, in the default mode, the execution of the video game enables a multiplayer version of the video game, and wherein, in the alternative mode, the execution of the video game enables only a single player version of the video game.

Optionally, the computer program product is further configured to stop the execution of the video game in the first mode and initiate execution of the video game in the second mode based on at least one of a time, a location of the display, a button on the display, or a button on the mobile computing device.

In some embodiments, the present specification discloses a computer-implemented method for selecting a mode of a video game, the method being implemented in a mobile computing device having a processor and a random access memory, wherein the processor is in data communication with a display and with a storage unit, the method comprising: identifying an orientation of the mobile computing device; providing the video game in a first mode, based on the identified orientation; identifying a change to the orientation of the mobile computing device; and changing the video game to a second mode, based on the identified orientation, wherein the first mode has a first plurality of features, wherein the second mode has a second plurality of features, and wherein at least a portion of the first plurality of features is different from at least a portion of the second plurality of features.

Optionally, the first plurality of features do not include a function enabling communication between players of the video game. Optionally, the second plurality of features includes a function enabling communication between players of the video game.

Optionally, the orientation is one of a landscape orientation and a portrait orientation. Optionally, when in the landscape orientation, the video game is in the first mode and the first plurality of features comprise features enabling a player of the video game to play the video game with other individuals. Optionally, when in the portrait orientation, the video game is in the second mode and the second plurality of features comprise features that enable a user to communicate with other individuals but do not enable the user of the video game to play the video game with other individuals.

Optionally, the first mode is a default mode and the second mode is an alternative mode and the alternative mode presents a shorter version of the video game relative to the default mode.

Optionally, the first mode is a default mode and the second mode is an alternative mode and the alternative mode comprises one or more communication features relative to the default mode.

Optionally, the first mode is a default mode and the second mode is an alternative mode, wherein the default mode is a multiplayer version of the video game, and wherein the alternative mode is a single player version of the video game.

Optionally, the computer-implemented method further comprises changing between the first mode and the second mode further based on at least one of a time, a location of the display, a button on the display, or a button on the computer.

In some embodiments, the present specification also discloses a computer program product configured to be executed in a mobile computing device having a processor and a memory and configured to be stored in the memory, wherein, when executed by the mobile computing device, the computer program product selects a mode of a video game being executed in the mobile computing device by: identifying an orientation of the mobile computing device; providing the video game in a first mode, based on the identified orientation; identifying a change to the orientation of the mobile computing device; and changing the video game to a second mode, based on the identified orientation, wherein the first mode has a first plurality of features, wherein the second mode has a second plurality of features, and wherein at least a portion of the first plurality of features is different from at least a portion of the second plurality of features.

Optionally, the first plurality of features do not include a function enabling communication between players of the video game. Optionally, the second plurality of features includes a function enabling communication between players of the video game.

Optionally, the orientation is one of a landscape orientation and a portrait orientation. Optionally, when in the landscape orientation, the video game is in the first mode and the first plurality of features comprise features enabling a player of the video game to play the video game with other individuals. Optionally, when in the portrait orientation, the video game is in the second mode and the second plurality of features comprise features that enable a user to communicate with other individuals but do not enable the user of the video game to play the video game with other individuals.

Optionally, the first mode is a default mode and the second mode is an alternative mode and wherein the alternative mode presents a shorter version of the video game relative to the default mode.

Optionally, the first mode is a default mode and the second mode is an alternative mode and the alternative mode comprises one or more communication features relative to the default mode.

Optionally, the first mode is a default mode and the second mode is an alternative mode, wherein the default mode is a multiplayer version of the video game, and wherein the alternative mode is a single player version of the video game.

Optionally, the computer program product is further configured to change between the first mode and the second mode further based on at least one of a time, a location of the display, a button on the display, or a button on the computer.

The aforementioned and other embodiments of the present specification shall be described in greater depth in the drawings and detailed description provided below.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Figure 1A:
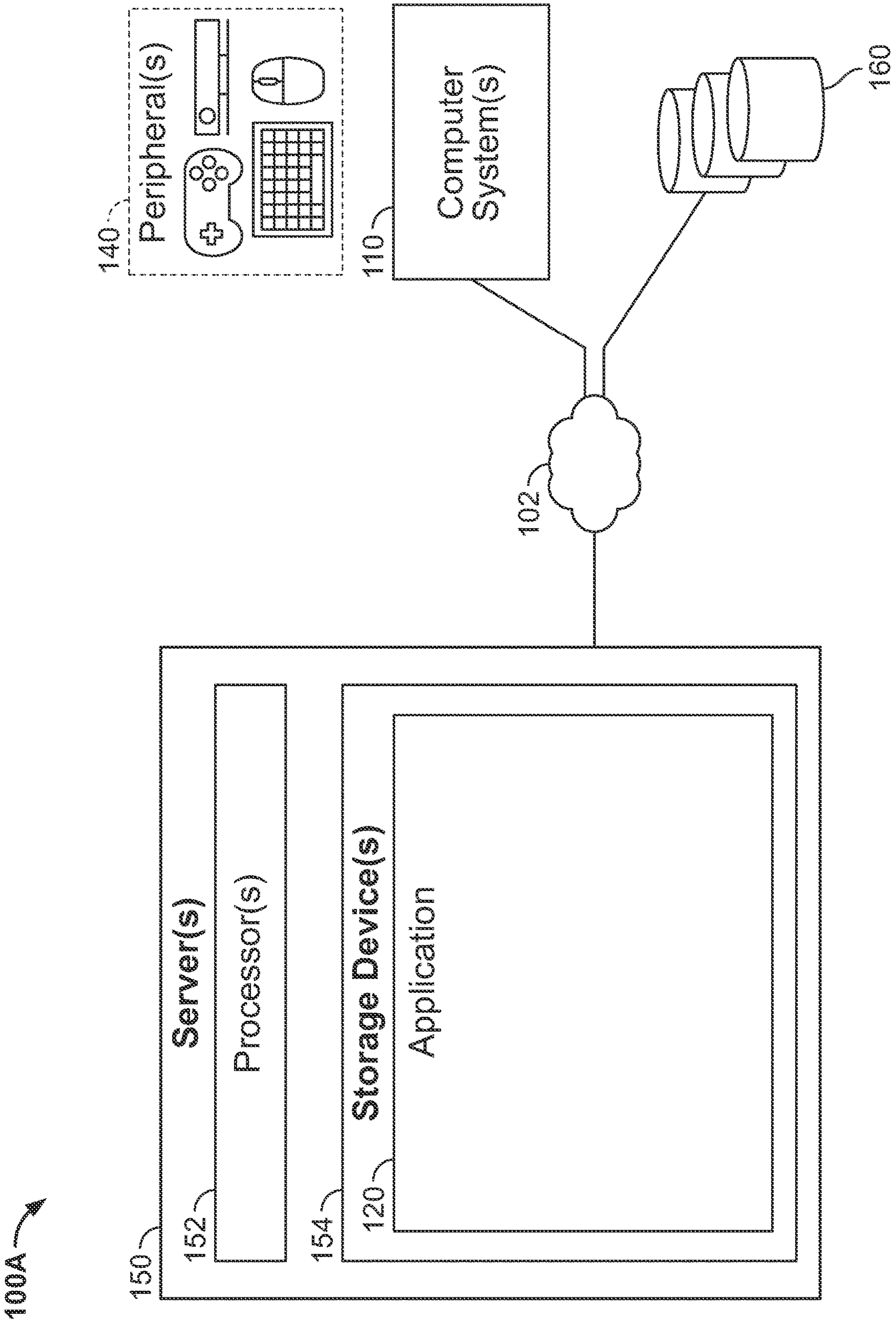
FIG. 1A is a block diagram of a system for providing mobile games, according to one embodiment of the present specification.

The present specification is directed toward mobile or handheld video games that provide feature changes including at least a format change based on one or more triggers. The triggers may include, among others: changing an orientation of the mobile or handheld device, changing a location of the mobile or handheld device, change in time of day or week, a screen gesture, a physical gesture that is recorded by a camera of the mobile or handheld device, activating a button on the video game's user interface (UI), or activating a button or combination of buttons physically available on the mobile or handheld device. The feature changes triggered in the mobile or handheld device encompass an expansive shift in a mode of the video game.

A first (default) mode of the video game corresponds to an actual and complete video game with features that are essential to play and engage with the game. In embodiments, a second, alternative mode is a modified version of the game that may include a different set of features than the features of first mode, a subset of the features of the first mode, or a limited set of features compared to the first mode. In some embodiments, communication features that enable chat and social interaction with other players (such as, friends, family, clan members) are provided in the second mode. In embodiments, the second mode includes a set of features that is different than the set of features provided in the first mode. In embodiments, the second mode provides a combination of a subset and/or alternative set of features and optionally, provides a modified, preferably shortened or simplified version of the video game for game play. In embodiments, the second, alternative mode is configured to shorten a launch process of the video game, for example by removing any splash screens or introductory audiovisual elements. Further, in embodiments, the second mode provides one or more of communication and information features related with the video game, while not providing any game play functionality.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items, or meant to be limited to only the listed item or items. Any feature or component described in association with a specific embodiment may be used and implemented with any other embodiment unless clearly indicated otherwise.

As used herein and in the appended claims, the singular forms "a," "an," and "the" include plural references unless the context dictates otherwise. Although any systems and methods similar or equivalent to those described herein can be used in the practice or testing of embodiments of the present disclosure, the preferred, systems and methods are now described. Any feature or component described in association with a specific embodiment may be used and implemented with any other embodiment unless clearly indicated otherwise.

It should be appreciated that the programmatic methods described herein may be performed on any computing device, including a laptop, desktop, smartphone, tablet computer, specialized gaming console, handheld gaming console, or virtual reality system. Preferably, the computing device is a mobile computing device, such as a mobile phone or a tablet computer. The computing device comprises at least one processor and a nonvolatile memory that stores the programmatic instructions which, when executed by the processor, perform the methods or steps disclosed herein, including the generation of a graphical user interface that is communicated to a local or remote display. The computing device is in communication with at least one remotely located server through a network of any type.

The embodiments disclosed herein are directed to an improvement in computer-related technology (enabling computers to enable improved gaming experiences in an online multiplayer gaming environment), and thus do not recite abstract ideas or concepts. The improved computing gaming experiences are achieved through the use of specific rules to collect and evaluate player data within the gaming environment which, when executed, enable the automation of specific content generation, and other gaming experiences that previously were not available or could not be automated. These new computer gaming rules improve existing technological processes in gaming and product placement and, therefore, are not abstract or conceptual in nature. This specification therefore teaches how the disclosed inventions improve a gaming technology using a specific set of rules, and particular solutions to the aforementioned failures in conventional gaming systems to achieve the desired outcomes.

While aspects of the present specification may be described herein with reference to various game levels or modes, characters, roles, game items, and any other characteristic associated with a particular genre of video game, it should be appreciated that any such examples are for illustrative purposes only, and are not intended to be limiting. The systems and methods described in detail herein may be used in any genre of video game or any kind of a virtual environment, without limitation.

The terminology used within this specification and detailed description of the various embodiments is for the purpose of describing particular embodiments only and is not intended to limit the invention.

As used herein, the term "single player video game" may be construed to mean a specific hardware architecture in which one or more servers may electronically communicate with a human player that solely provides input for a gaming session and in which the gaming session only includes one human player.

As used herein, the term "a multiplayer game environment" or "massively multiplayer online game" may be construed to mean a specific hardware architecture in which one or more servers electronically communicate with, and concurrently support game interactions with, a plurality of client devices, thereby enabling each of the client devices to simultaneously play in the same instance of the same game. Preferably the plurality of client devices number in the dozens, preferably hundreds, preferably thousands. In one embodiment, the number of concurrently supported client devices ranges from 10 to 5,000,000 and every whole number increment or range therein. Accordingly, a multiplayer game environment or massively multiplayer online game is a computer-related technology, a non-generic technological environment, and should not be abstractly considered a generic method of organizing human activity divorced from its specific technology environment.

As used herein, the term "video game" is used to include both single and multiplayer video games.

A game mode is a state of the single or multiplayer video game which is defined by the number and type of features available to the single or multiple players. If a game mode includes a full range of the number and type of features typically available to players of the video game, the game mode may be described as untruncated or default. If a game mode provides different features or less than the full range of the number and type of features typically available to players, the game mode may be described as truncated or alternative. The untruncated mode may provide a set of features required to allow a player to play the video game or a complete version of the video game. The truncated mode may include a set of features that may either partially overlap with the features of the untruncated mode, a subset of features of the untruncated mode, or an alternative set of features different than those included in the untruncated mode. For example, a truncated or alternative mode may allow a player to engage in some, but not all, of the activities provided in the untruncated mode. A truncated mode may allow a player to engage in mini games not available in the untruncated mode. A truncated mode may allow players to communicate, via text, voice, or video chat, with other players of the video game without actually playing the game.

Exemplary System Architecture

Figure 1B:
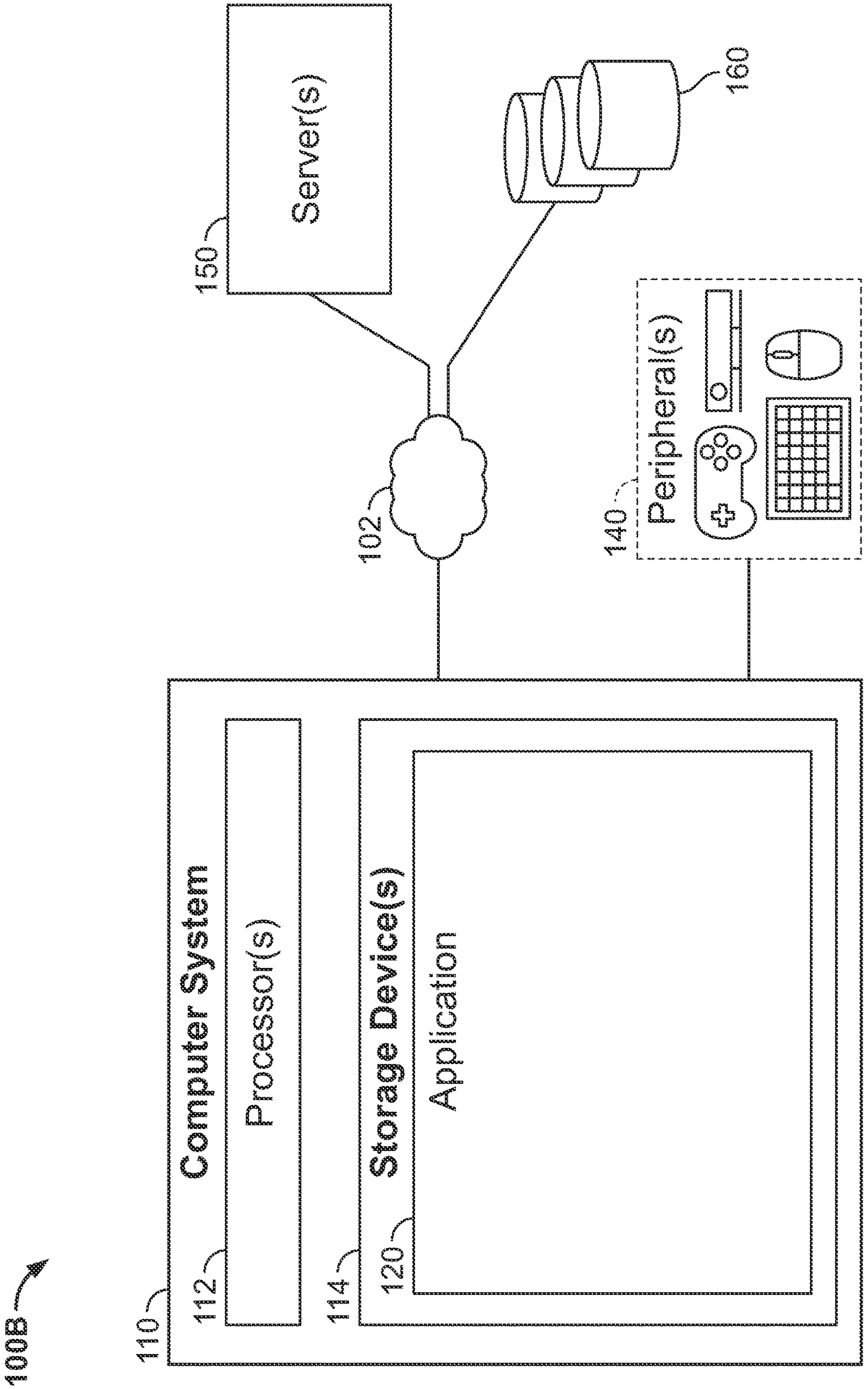
FIG. 1B is a block diagram of another system for providing mobile games, according to one embodiment of the present specification.

FIGS. 1A and 1B illustrate systems for providing multiplayer video games, according to some embodiments of the present specification, referred to as a multiplayer game environment or multiplayer gaming environment. FIG. 1A illustrates an implementation in which server(s) 150 function as a host computer that hosts gameplay between other devices, such as computer system(s) 110. FIG. 1B illustrates an implementation in which a given computer system 110 functions as a host computer that hosts gameplay between (or with) other devices, such as other computer system(s) 110. Unless specifically stated otherwise, the description of various system components may refer to either or both of FIGS. 1A and 1B.

System 100 may be used to implement various embodiments described in subsequent sections of the present specification. For example, system 100 may implement various programs that result in an ability to switch modes in a game based on one or more input identified from the computer system 110. In one implementation, system 100 may include one or more computer systems 110, one or more servers 150, one or more databases 160, and/or other components.

Computer system 110 may be configured as a gaming console, a handheld gaming device, a personal computer (such as, a desktop computer, a laptop computer, or any other type of personal computing device), a smartphone, a tablet computing device, a smart television, and/or other device that can be used to interact with an instance of a video game. Preferably, the computer system 110 is a mobile computing device, such as a mobile phone or a tablet computer.

Referring to FIG. 1B, computer system 110 may include one or more processors 112 (also interchangeably referred to herein as processors 112, processor(s) 112, or processor 112 for convenience), one or more storage devices 114 (which may store one or more applications 120), one or more peripherals 140, and/or other components. Processors 112 may be programmed by one or more computer program instructions. For example, processors 112 may be programmed by application 120 and/or other instructions (such as gaming instructions used to instantiate the game).

Depending on the system configuration, application 120 (or portions thereof) may be part of a game application, which creates a game instance to facilitate gameplay. Alternatively or additionally, application 120 may run on a device such as a server 150 to perform its designated function(s) for users in an "online" game hosted by server 150.

Application 120 may include instructions that program computer system 110, each of which are described in greater detail herein. As used herein, for convenience, the various instructions will be described as performing an operation, when, in fact, the various instructions program the processors 112 (and therefore computer system 110) to perform the operation.

Peripherals 140 may be used to obtain an input (such as, direct input, measured input, among other types of input) from a player. Peripherals 140 may include, without limitation, a game controller, a gamepad, a keyboard, a mouse, an imaging device such as a camera, a motion sensing device, a light sensor, a biometric sensor, and/or other peripheral device that can obtain an input from and/or relating to a player. Peripherals 140 may be coupled to a corresponding computer system 110 via a wired and/or wireless connection.

Server 150 may include one or more computing devices. Referring back to FIG. 1A, Server 150 may include one or more physical processors 152 (also interchangeably referred to herein as processors 152, processor(s) 152, or processor 152 for convenience) programmed by computer program instructions, one or more storage devices 154 (which may store an application 120), and/or other components. Processors 152 may be programmed by one or more computer program instructions. For example, processors 152 may be programmed by gaming instructions used to instantiate the game.

Depending on the system configuration, application 120 (or portions thereof) may be part of a game application, which creates a game instance to facilitate gameplay. Alternatively, or additionally, portions or all of application 120 may run on computer system 110 or server 150. Application 120 may include instructions that program server 150 to perform various operations, each of which are described in greater detail herein. As used herein, for convenience, the various instructions will be described as performing an operation, when, in fact, the various instructions program the processors 152 (and therefore server 150) to perform the operation.

Although illustrated in FIGS. 1A and 1B as a single component, computer system 110 and server 150 may include a plurality of individual components (such as computer devices) each programmed with at least some of the functions described herein. In this manner, some components of computer system 110 and/or server 150 may perform some functions while other components may perform other functions, as would be appreciated. The one or more processors (112, 152) may each include one or more physical processors that are programmed by computer program instructions. Thus, either or both server 150 and computer system 110 may function as a host computer programmed by application 120. The various instructions described herein are exemplary only. Other configurations and numbers of instructions may be used, so long as the processor(s) (112, 152) are programmed to perform the functions described herein.

Furthermore, it should be appreciated that although the various instructions are illustrated in FIGS. 1A and 1B as being co-located within a single processing unit, in implementations in which processor(s) (112, 152) includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) (112, 152) may be programmed by one or more additional instructions that may perform some or all of the functionality attributed herein to one of the instructions.

The various instructions described herein may be stored in a storage device (114, 154) which may comprise random access memory (RAM), read only memory (ROM), and/or other memory. The storage device may store the computer program instructions (such as, the aforementioned instructions) to be executed by processor (112, 152) as well as data that may be manipulated by processor (112, 152). The storage device may comprise floppy disks, hard disks, optical disks, tapes, or other storage media for storing computer-executable instructions and/or data.

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

The various databases 160 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Figure 2A:
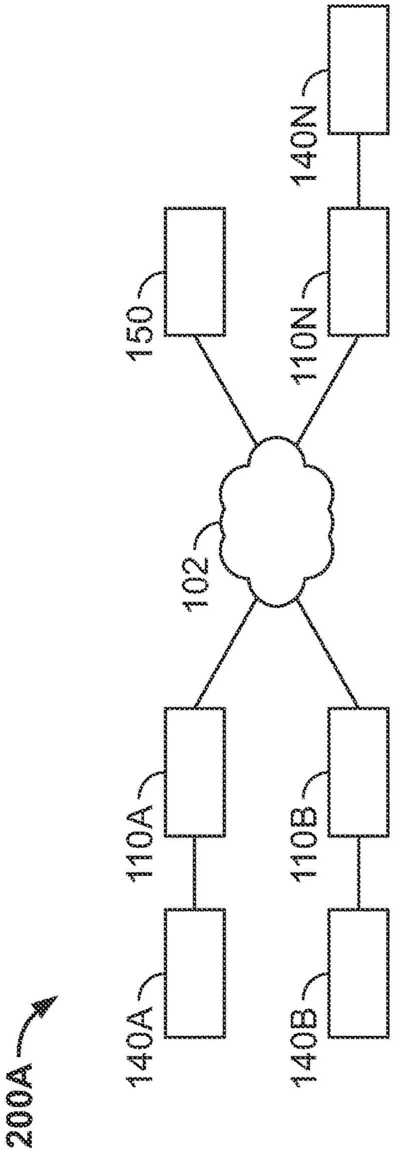
FIG. 2A illustrates an exemplary system configuration in which a server hosts a plurality of devices to facilitate a mobile game, according to an embodiment of the present specification.

FIG. 2A illustrates an exemplary system configuration 200A in which a server hosts a plurality of computer devices to facilitate a multiplayer game, according to an implementation of the present specification. In one implementation, one or more servers 150 (illustrated in FIGS. 1A and 1B) may host a number of computer systems 110 (illustrated as computer systems 110A, 110B, . . . , 110N) via a network 102. Each computer system 110 may include one or more peripherals (illustrated as peripherals 140A, 140B, . . . , 140N). In this manner, one or more servers 150 may facilitate the gameplay of different players using different computer systems 110 and/or otherwise provide one or more operations of application 120 (illustrated in FIGS. 1A and 1B).

In some instances, a given server 150 may be associated with a proprietary gameplay network system, such as, without limitation, the Sony PlayStation® Network, Microsoft Xbox Live®, and/or any other gameplay network system. In this implementation, a given computer system 110 may be associated with a particular type of gaming console. Other types of computer systems 110 using other types of gameplay networks may be used as well.

Figure 2B:
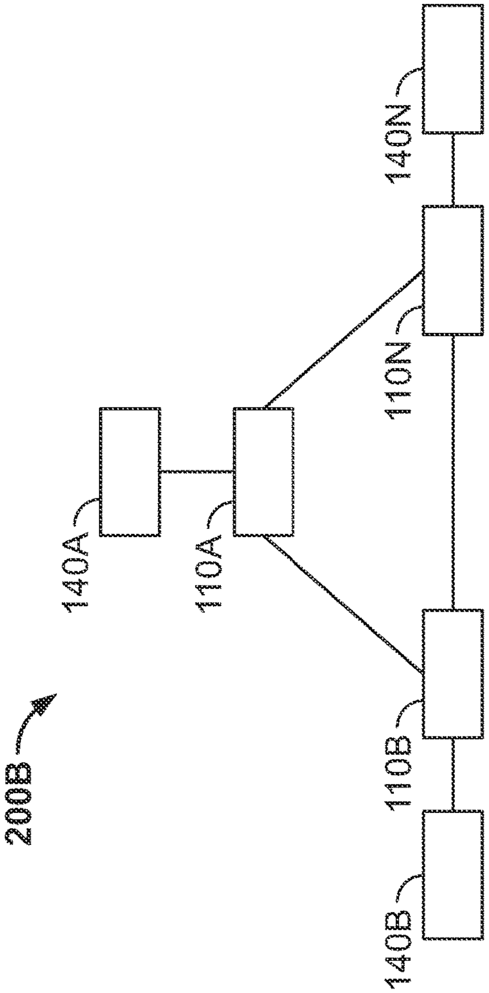
FIG. 2B illustrates an exemplary system configuration in which a plurality of systems are networked together to facilitate a multiplayer game, according to an embodiment of the present specification.

FIG. 2B illustrates an exemplary system configuration 200B in which a plurality of computer systems 110 are networked together to facilitate a multiplayer game, according to an implementation of the present specification. Any one or more of the computer devices 110 may serve as a host and/or otherwise provide one or more operations of application 120 (illustrated in FIGS. 1A and 1B).

Figure 2C:
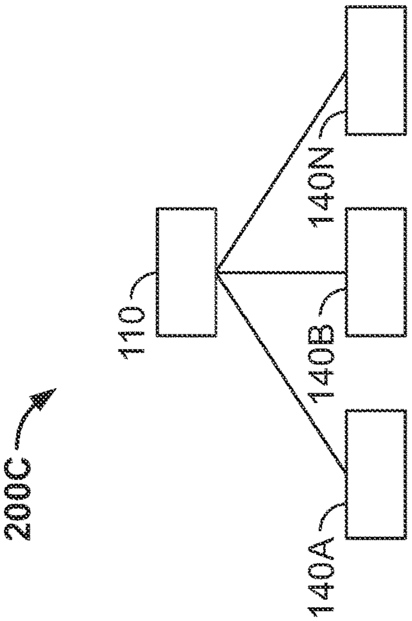
FIG. 2C illustrates an exemplary system configuration in which a computer system is used by a plurality of users to facilitate a multiplayer game, according to an embodiment of the present specification.

FIG. 2C illustrates an exemplary system configuration 200C in which a computer system 110 is used by a plurality of users to facilitate a multiplayer game, according to an implementation of the present specification. In an implementation, computer system 110 may be considered to host the multiplayer game and/or otherwise provide one or more operations of application 120 (illustrated in FIGS. 1A and 1B).

Referring to FIGS. 2A-2C, simultaneously, in an implementation, a host may facilitate the multiplayer game by sending invitations to one or more contacts through social groups, to play the game and/or performing other operations described herein. In an implementation, at least some of these operations may also or instead be performed by one or more individual computer systems 110. Furthermore, the illustrated system configurations are exemplary only and should not be viewed as limiting in any way. Other system configurations may be used as well, as would be appreciated by those having skill in the art.

Identifying Player Input and Switching Modes

In embodiments application 120 is configured to identify one or more inputs that are provided from the mobile computer device 110. The identified input is used to either launch a game in one of multiple modes (untruncated mode or truncated mode) or trigger a change in a mode of a video game (from untruncated mode to truncated mode or vice-versa) that has been launched. The input may be a single input or a combination of two or more inputs. The input that is identified by application 120 may be specified by a user of computer system 110. In some embodiments, the input identified by application 120 is defined by application 120 and/or in server 150.

In one embodiment, the input relates to the type of display of computer system 110. The type of display may include an orientation of the display, such as a portrait display or a landscape display. The orientation is identified by mobile computing device 110, from the device's accelerometer and/or gyroscope. In further embodiments, the display type may refer to a full screen display, a wide screen display, or any other display option that is selected by the user in the mobile computing device 110. In one embodiment, the input is provided from an option enabled through a user-interface (UI) provided by application 120, by the user of the mobile computing device 110. The option selected by the user specifies one of multiple modes (untruncated mode or truncated mode) in which the game is preferred to be launched. In some other embodiments, the input includes the user's actuation of one or more buttons on the game's UI, an on-screen gesture like double tapping, swiping, or pinching, or toggling a physical button, or activating any button combination on the mobile computing device 110. In embodiments, the input is in the form of a location, time, and/or day of the computer system 110. In embodiments, the input is some combination of any of the foregoing or any other input receivable by the mobile computing device 110.

More specifically, in one embodiment a component within the mobile computing device 110, such as an accelerometer or gyroscope, generates data indicative of the orientation of the mobile computing device 110. When a user initiates a game on the mobile computing device 110, the game acquires data indicative of the orientation of the mobile computing device 110 from the component and based on the data, determines in what mode to launch the game. The game mode will expressly include, or not include, certain game features depending on the orientation of the mobile computing device 110. For example, if the data indicates the mobile computing device 110 is in a landscape mode, the game mode may be untruncated or default, which may be a conventional multiplayer or single player game mode that provides access to all of the conventional features of the game. If, however, the data indicates the mobile computing device 110 is in a portrait mode, the game mode may be a truncated or alternative, "communication-only" mode in which the game is launched but without the competitive game features and only with the communication features, such as voice, text, or video chat communications. It should be appreciated that the mode change reflects the inclusion, or exclusion, of features beyond simply the display format.

Application Architecture

Figure 3:
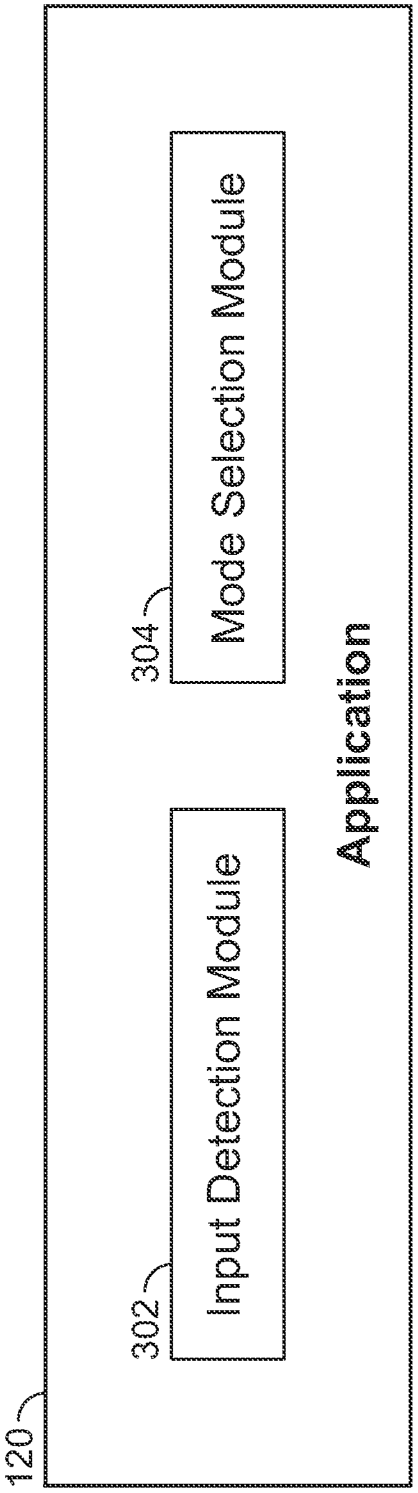
FIG. 3 illustrates an exemplary set of modules implemented by the application described in context of FIGS. 1A and 1B, in accordance with some embodiments of the present specification.

FIG. 3 illustrates an exemplary set of modules implemented by application 120 described in context of FIGS. 1A and 1B, in accordance with some embodiments of the present specification. In some embodiments, application 120 provides or implements a plurality of modules, such as, but not limited to, an input detection module 302 that detects the presence and type of an input and a mode selection module 304 that triggers one of multiple modes of a game that has been launched, based on the input identified by module 302. It should be appreciated that the term 'module' refers to computer logic utilized to provide a desired functionality, service or operation. In various embodiments, a module can be implemented in hardware, firmware and/or software controlling a general purpose processor. In one embodiment, the modules are programmatic codes or computer executable instructions stored on a storage system, such as the game and business database system 160, and executed by a processor.

In some embodiments, module 302 is configured to identify the type of input available from the computer system 110. The input is provided from a single source or a combination of two or more sources. The input sources may include a setting enabled by the user of the game through a UI, a button in the UI game that is activated by the user, a screen gesture, an orientation of the display of computer system 110, a location of computer system 110, a time, activation of one or more physical buttons provided by the computer system 110, or a physical gesture that is recorded by a camera of the computer system 110.

Module 304 is configured to receive the input identified by module 302 and select a mode for operating the game in the computer system 110. The selected mode may be one of multiple modes (truncated or untruncated) which is selected for implementing in computer system 110. In an embodiment, a first mode may correspond to an untruncated mode that may be the default game play mode, which enables a user of computer system 110 to play the game with standard features of the game.

Figure 4A:
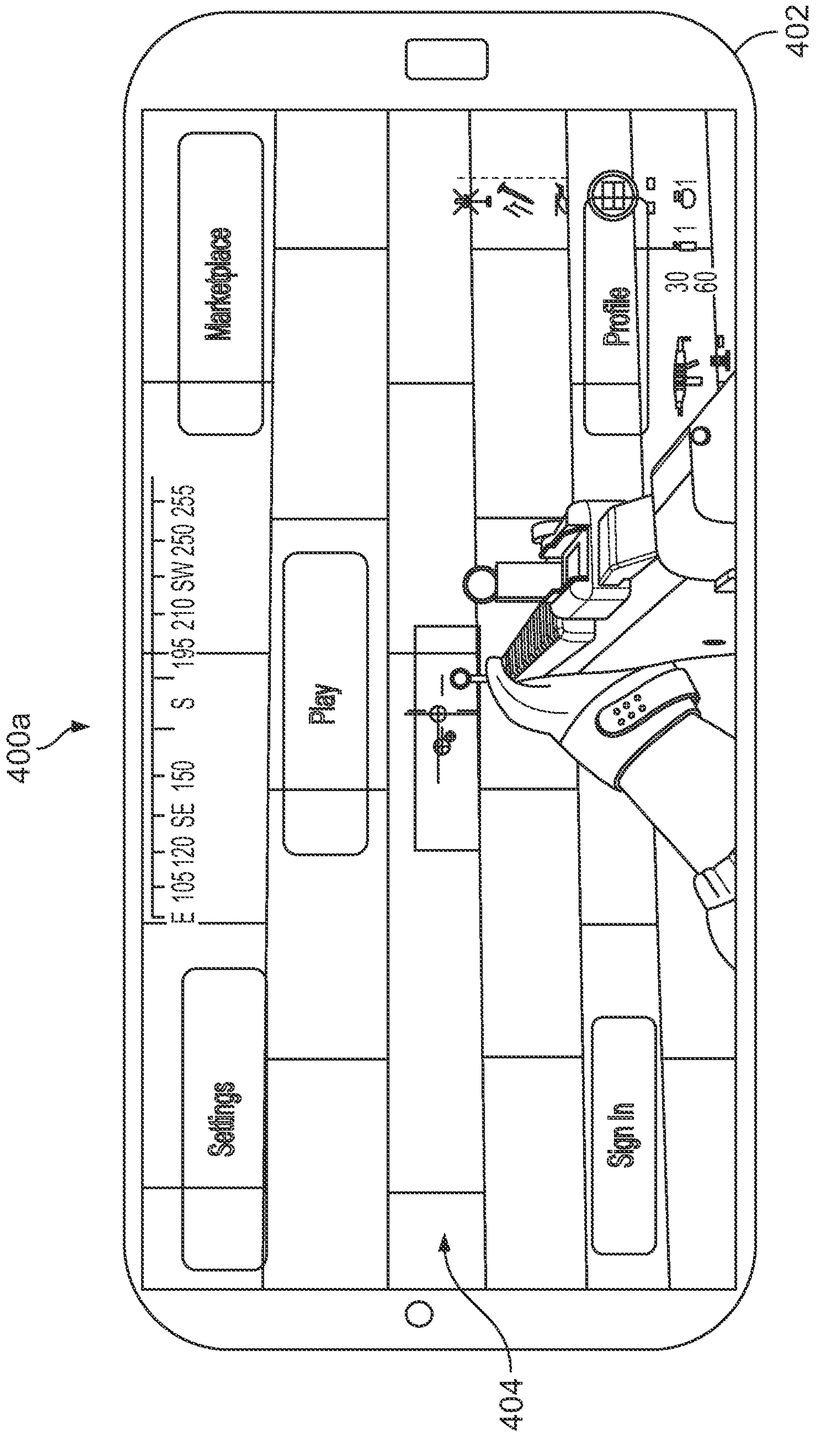
FIG. 4A illustrates an exemplary interface presented to a player in an untruncated or default mode, in accordance with some embodiments of the present specification.

FIG. 4A illustrates an exemplary interface 400*a* presented to a player in the untruncated or default mode, in accordance with some embodiments of the present specification. In the illustrated example, a handheld device 402 is positioned so that the display 404 has a landscape orientation. The interface 400*a* shows standard options to initiate game play. In some embodiments, the game is loaded in the background while the options are displayed through interface 400*a*. The player may select the option to play and subsequently start playing the game. The standard features of the game may require a first amount of loading time to load and display the screen to play the game normally. The default mode may additionally load the normal audiovisual elements that accompany the game.

Figure 4B:
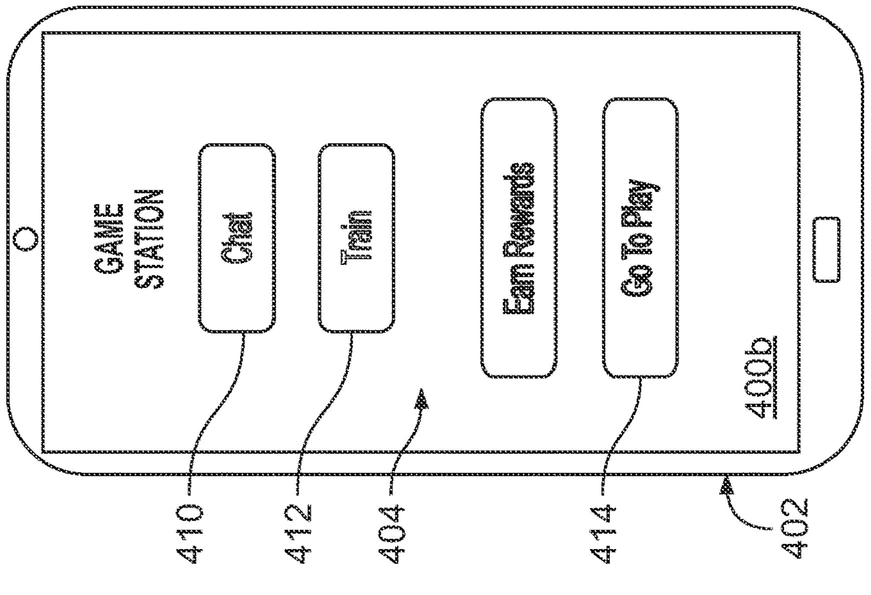
FIG. 4B illustrates an exemplary interface presented to a player in a truncated or alternative mode, in accordance with some embodiments of the present specification.

In an embodiment, an alternative or truncated mode of the game may offer an alternative to the default mode by including one or more of: a subset of the features provided in the untruncated or default mode, a limited set of the features compared to the untruncated or default mode, or an alternative set of features different from the features in the untruncated or default mode. FIG. 4B illustrates an exemplary interface 400*b* presented to a player in the truncated or alternative mode, in accordance with some embodiments of the present specification. In FIG. 4B, the display 404 of handheld device 402 is modified as the device 402 is positioned in portrait orientation. Interface 400*b* provides limited various options to the user, such as in-game 'chat' 410 and 'train' 412. In some embodiments, a 'go to play' option 414 is included, which, when chosen by the user, returns the player to the untruncated, default game mode. The option to train may provide the user byte-size games that sharpen gaming skills and can be used to practice playing the actual game.

Figure 4C:
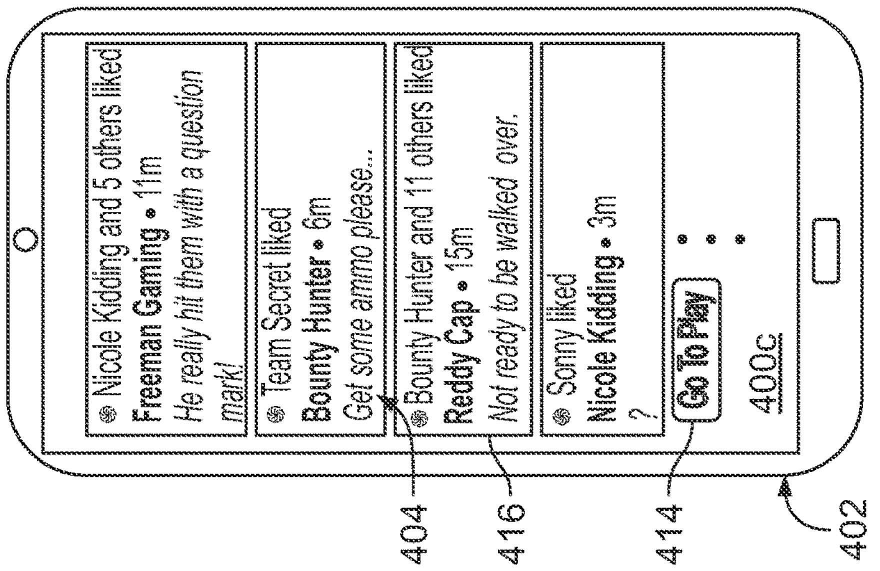
FIG. 4C illustrates another exemplary interface presented to a player in the truncated or alternative mode, in accordance with some embodiments of the present specification.

FIG. 4C illustrates another exemplary interface 400*c* presented to a player in the truncated or alternative mode, in accordance with some embodiments of the present specification. The interface 400*c* may be either directly presented to the user when in the alternative mode, bypassing a menu of options, or may be presented to the user if the user selects to engage in in-game chat without actively playing the game. FIG. 4C illustrates a text chat which, in some embodiments, may be accessed by choosing the 'chat' 412 option shown in FIG. 4B. The display 404 of interface 400*c* lists the most recent in-game chat messages 416 that may be uploaded by other players, such as and not limited to the family or clan of players of the user. The user may add own messages to the chat. Previous or older chats may be accessed by the user by scrolling the interface. In some embodiments, the chat includes a 'go to play' 414 option for returning to the untruncated or default game mode.

Figure 4D:
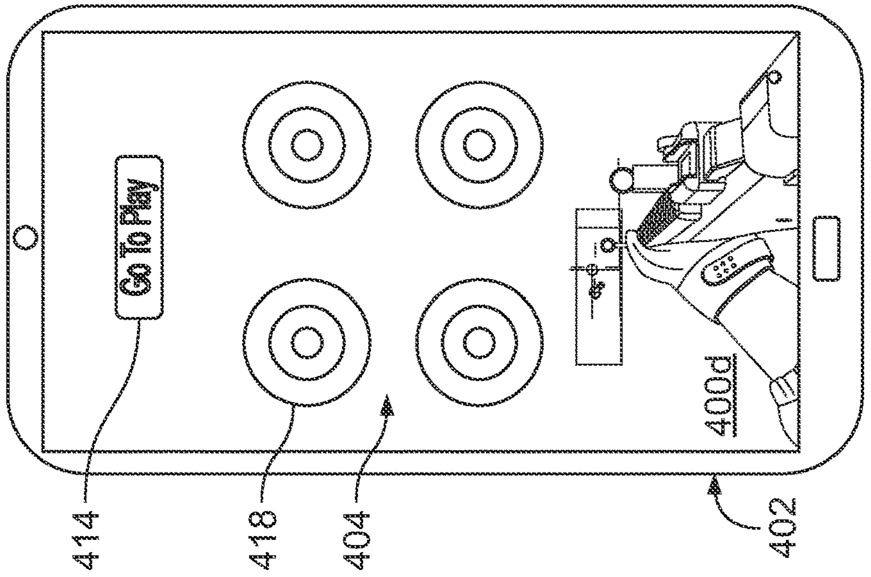
FIG. 4D illustrates another exemplary interface presented to a player in the truncated or alternative mode, in accordance with some embodiments of the present specification.

FIG. 4D illustrates another exemplary interface 400*d* presented to a player in the truncated or alternative mode, in accordance with some embodiments of the present specification. The interface 400*d* may be either directly presented to the user when in the alternative mode, bypassing a menu of options, or may be presented to the user if the user selects to engage in training, without actively playing the game. FIG. 4D illustrates a 'minigame' which, in some embodiments, may be accessed by choosing the 'train' 412 option shown in FIG. 4B. The display 404 presents a minigame or training session. For example, in one embodiment, the minigame includes targets 418 wherein the untruncated or default mode, as shown in FIG. 4A, comprises a first person shooter (FPS) game. In some embodiments, the minigame includes a 'go to play' 414 option for returning to the untruncated or default game mode.

In some embodiments, the truncated/alternative mode has communication features, such as those shown in FIG. 4C, which enable text, voice and/or video messaging with other players of the game. The other players may include user's game friends, family, or clan. In some embodiments, the truncated/alternative mode does not support the game's game play functionalities, or may support an alternative form of play. In embodiments, the truncated/alternative mode is configured to be streamlined and/or less disruptive than the default mode of the game. In one example, the truncated/alternative mode may be a messaging application with no audiovisual elements (or those reflecting the notification settings for the mobile device's other messaging applications). In one example, the truncated/alternative mode requires a second amount of loading time that is less than the first amount of loading time required to load the untruncated/default mode.

In some embodiments, the truncated or alternative mode may provide gameplay, but the game may be simpler (or a subset) of those provided in the untruncated/default mode. In one example, in a basketball video game, the untruncated or default mode enables a player to play a basketball video game, whereas the truncated or alternative mode allows the player to do a quick "bite-sized" training game to help level up the player's team. In another example of the basketball video game, the truncated alternative mode provides a metagame that is played outside of the main game. In some embodiments, the genre of the simpler game in the truncated or alternative mode may be unrelated to the primary version of the game in the untruncated or default mode. In one example, in a racing game, the alternative mode might provide a simple and relatively quick puzzle game. The completion of the puzzle game could provide certain benefits to the player in the untruncated or default mode of the game, for example, in the form of vehicle upgrades or unlocking new race tracks. In embodiments, the truncated or alternative mode combines messaging features with an alternative game from the game in the default mode.

In some embodiments, the untruncated/default mode is the normal version of a video game. If the game is configured to be played in a landscape display orientation, then launching the game while the computer system 110 is in landscape mode starts the game in default mode. If the game is meant to be played in a portrait display orientation, then launching the game while the computer system 110 is in portrait mode starts the game in default mode.

Module 302 continually identifies the input. A change in the input is communicated to module 304, which, based on the change in the input, triggers a change in the mode. If the game was in the untruncated/default mode, a change in input triggers a switch to the truncated/alternative mode, and vice versa. In the example stated above, a game that is normally played in the landscape display orientation launches in or switches to the untruncated or default mode when the computer system 110 is in the landscape orientation. Similarly, the game launches in or switches to truncated/alternative mode when the phone is in the opposite orientation (in which the game is not meant to be played in). A game that is configured to be played in the untruncated or default mode in the landscape display orientation will switch its mode when the computer system 110 is changed to the portrait display orientation. In some embodiments, changing the orientation provides an additional and relatively faster method for the user to access messaging features in the game.

In some embodiments, the untruncated or default mode of the game loads in the background while the user is in the truncated/alternative mode. In such embodiments, if the user decides to switch into default mode, the experience of the switch will be fast and seamless. In some cases, switching to untruncated/default mode after background loading may bypass certain aspects of the game's UI, such as loading of splash screens, taking the user straight into the game's main menu page.

In some embodiments, the user of computer system 110 enables the ability to switch modes of a video game based on one or more inputs. The user may also disable the ability to switch between modes. In some embodiments, the user selects the types of inputs that trigger a switch between the different modes. In one example, the user defines one or more locations where the game launches in or switches to an alternative mode. The user may prefer the truncated/alternative mode, which is configured to be less distracting than the untruncated/default mode, in locations such as school or the workplace.

Figure 5:
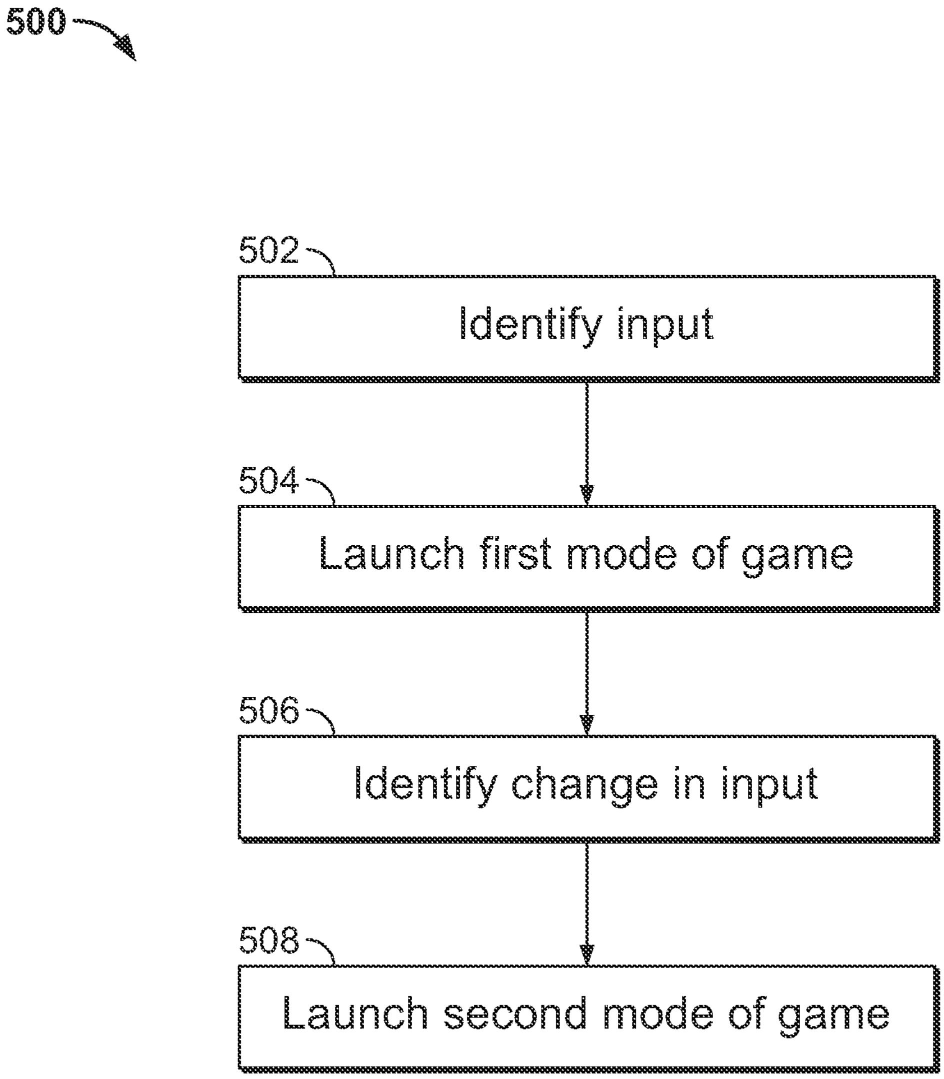
FIG. 5 is a flow chart illustrating a process for triggering a particular game mode, in accordance with some embodiments of the present specification.

FIG. 5 is a flow chart illustrating a process for triggering one of multiple modes of a game, in accordance with some embodiments of the present specification. In embodiments, the process is configured to be implemented by a combination of modules implemented by application 120 for a video game. At step 502, input detection module 302 of FIG. 3 identifies the one or more inputs configured to cause the game to launch in a particular mode. In various embodiments, the types of inputs include one or a combination of the following: screen orientation, geographical location, physical buttons on the gaming device, screen buttons on the games device, screen swipes on the display of the gaming devices, voice commands, or external devices connected to the gaming device. The input and corresponding mode may be specified in application 120, or may be specified by the user of computer system 110 through application 120. At step 504, mode selection module 304 of FIG. 3 selects a first mode that corresponds to the input identified at step 502. Based on the input, the first mode may be either the default or untruncated mode or the alternative or truncated mode. At step 506, while the game application is open, module 302 is configured to detect a change in the input identified at step 502. At step 508, mode selection module 304 is triggered to switch from the first mode to select a second mode. If the first mode provides the untruncated or default mode of the game, the second mode provides the truncated or alternative modes. If the first mode provides the truncated or alternate version of the game, the second mode provides the untruncated or default mode.

The above examples are merely illustrative of the many applications of the system and method of present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

What is claimed is:

1. A computer-implemented method for selecting a mode of a video game, the method being implemented in a mobile computing device having a processor and a random access memory, wherein the processor is in data communication with a display and with a storage unit, the method comprising:

identifying a first orientation of the mobile computing device;

executing the video game in a first mode based on the identified first orientation, wherein the first mode is a default mode and is defined by the video game executing with a first plurality of features;

identifying a change to the first orientation of the mobile computing device, wherein said change indicates a player of the video game has physically caused the mobile computing device to adopt a second orientation and wherein the second orientation is different from the first orientation; and based on the second orientation, stopping the execution of the video game in the first mode and initiating an execution of the video game in a second mode, wherein the second mode is an alternative mode and is defined by the video game executing with a second plurality of features, wherein at least a portion of the first plurality of features is different from at least a portion of the second plurality of features, and wherein the execution of the video game is shorter in the alternative mode than in the default mode.

2. The computer-implemented method of claim 1, wherein the first plurality of features do not include a function enabling communication between players of the video game.

3. The computer-implemented method of claim 2, wherein the second plurality of features includes a function enabling communication between players of the video game.

4. The computer-implemented method of claim 1, wherein the first orientation is one of a landscape orientation or a portrait orientation and wherein the second orientation is one of a portrait orientation or a landscape orientation.

5. The computer-implemented method of claim 4, wherein, when in the landscape orientation, the video game is in the first mode and the first plurality of features comprise features enabling a player of the video game to play the video game with other individuals.

6. The computer-implemented method of claim 5, wherein, when in the portrait orientation, the video game is in the second mode and the second plurality of features comprise features that enable a user to communicate with other individuals and do not enable the user of the video game to play the video game with other individuals.

7. The computer-implemented method of claim 1, wherein the first mode is a default mode and the second mode is an alternative mode and wherein the alternative mode comprises one or more communication features that are not available in the default mode.

8. The computer-implemented method of claim 1, wherein the first mode is a default mode and the second mode is an alternative mode, wherein, in the default mode, the execution of the video game enables a multiplayer version of the video game, and wherein, in the alternative mode, the execution of the video game enables only a single player version of the video game.

9. The computer-implemented method of claim 1, wherein stopping the execution of the video game in the first mode and initiating the execution of the video game in the second mode is further based on at least one of time, a location of a display, a button on the display, or a button on the mobile computing device.

10. A computer program product configured to be executed in a mobile computing device having a processor and a memory and configured to be stored in the memory, wherein, when executed by the mobile computing device, the computer program product selects a mode of a video game being executed in the mobile computing device by:

identifying a first orientation of the mobile computing device;

executing the video game in a first mode, based on the identified first orientation, wherein the first mode is a default mode and is defined by the video game executing with a first plurality of features;

identifying a change to the first orientation of the mobile computing device, wherein said change indicates a player of the video game has physically caused the mobile computing device to adopt a second orientation and wherein the second orientation is different from the first orientation; and based on the second orientation, stopping the execution of the video game in the first mode and initiating an execution of the video game in a second mode, wherein the second mode is an alternative mode and is defined by the video game executing with a second plurality of features, wherein at least a portion of the first plurality of features is different from at least a portion of the second plurality of features, and wherein the execution of the video game is shorter in the alternative mode than in the default mode.

11. The computer program product of claim 10, wherein the first plurality of features do not include a function enabling communication between players of the video game.

12. The computer program product of claim 10, wherein the second plurality of features includes a function enabling communication between players of the video game.

13. The computer program product of claim 10, wherein the first orientation is one of a landscape orientation or a portrait orientation and wherein the second orientation is one of a portrait orientation or a landscape orientation.

14. The computer program product of claim 13, wherein, when in the landscape orientation, the video game is in the first mode and the first plurality of features comprise features enabling a player of the video game to play the video game with other individuals.

15. The computer program product of claim 13, wherein, when in the portrait orientation, the video game is in the second mode and the second plurality of features comprise features that enable a user to communicate with other individuals and do not enable the user of the video game to play the video game with other individuals.

16. The computer program product of claim 10, wherein the first mode is a default mode and the second mode is an alternative mode and wherein the alternative mode comprises one or more communication features that are not available in the default mode.

17. The computer program product of claim 10, wherein the first mode is a default mode and the second mode is an alternative mode, wherein, in the default mode, the execution of the video game enables a multiplayer version of the video game, and wherein, in the alternative mode, the execution of the video game enables only a single player version of the video game.

18. The computer program product of claim 10, wherein the computer program product is further configured to stop the execution of the video game in the first mode and initiate execution of the video game in the second mode based on at least one of a time, a location of the display, a button on the display, or a button on the mobile computing device.

* * * * *